United States Patent [19]
Ellich et al.

[11] Patent Number: 5,330,158
[45] Date of Patent: Jul. 19, 1994

[54] FLANGE SEAL

[75] Inventors: Thomas J. Ellich, Hibbing; Dennis J. Peterson, Virginia, both of Minn.

[73] Assignee: NewCon Co., Hibbing, Minn.

[21] Appl. No.: 122,776

[22] Filed: Sep. 16, 1993

Related U.S. Application Data

[63] Continuation of Ser. No. 851,467, Mar. 13, 1992, abandoned.

[51] Int. Cl.⁵ .................................................. F16K 3/00
[52] U.S. Cl. ..................................... 251/327; 251/363
[58] Field of Search ............... 251/326, 327, 328, 358, 251/361, 363, 329

[56] References Cited

U.S. PATENT DOCUMENTS

| | | | |
|---|---|---|---|
| 3,000,608 | 9/1961 | Williams | 251/170 |
| 3,993,092 | 11/1976 | Still | 137/454.2 |
| 4,026,517 | 5/1977 | Still | 251/214 |
| 4,051,863 | 10/1977 | Still | 137/454.2 |
| 4,112,969 | 9/1978 | Still | 137/454.2 |
| 4,201,365 | 5/1980 | Paptzun et al. | 251/328 |
| 4,231,389 | 11/1980 | Still et al. | 137/315 |
| 4,895,181 | 1/1990 | McKavanagh | 137/375 |
| 4,951,919 | 8/1990 | Haglund et al. | 251/328 |

Primary Examiner—John C. Fox
Attorney, Agent, or Firm—Cahill, Sutton & Thomas

[57] ABSTRACT

A flange seal, disposed on opposed sides of a bore and chest liner embodied in a gate valve and secured to one of a pair of rings disposed in opposed sides of the bore section of the liner, enhances the integrity of the seal formed between the gate valve and each respective radial flange of a connected pipe.

14 Claims, 3 Drawing Sheets

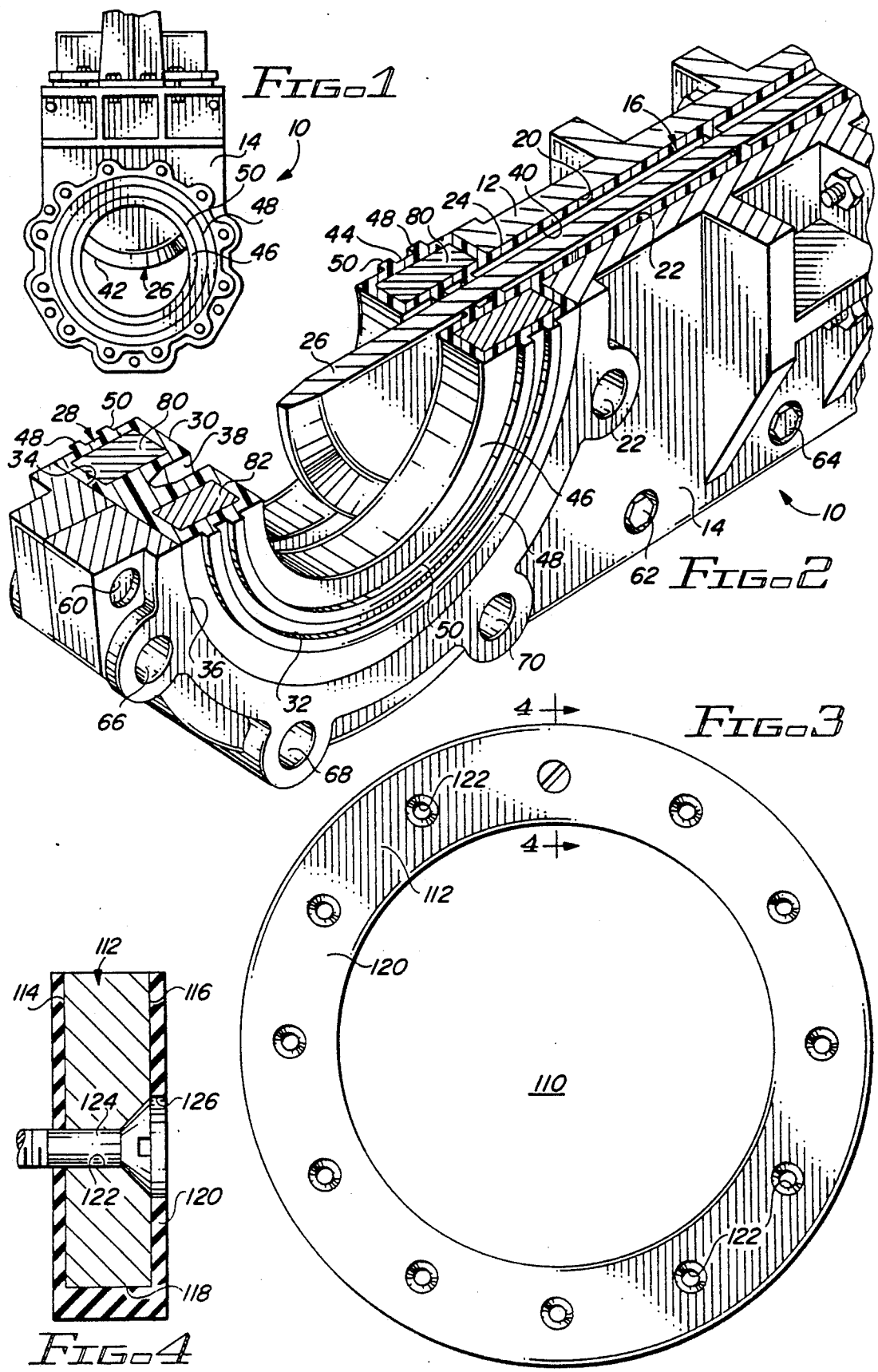

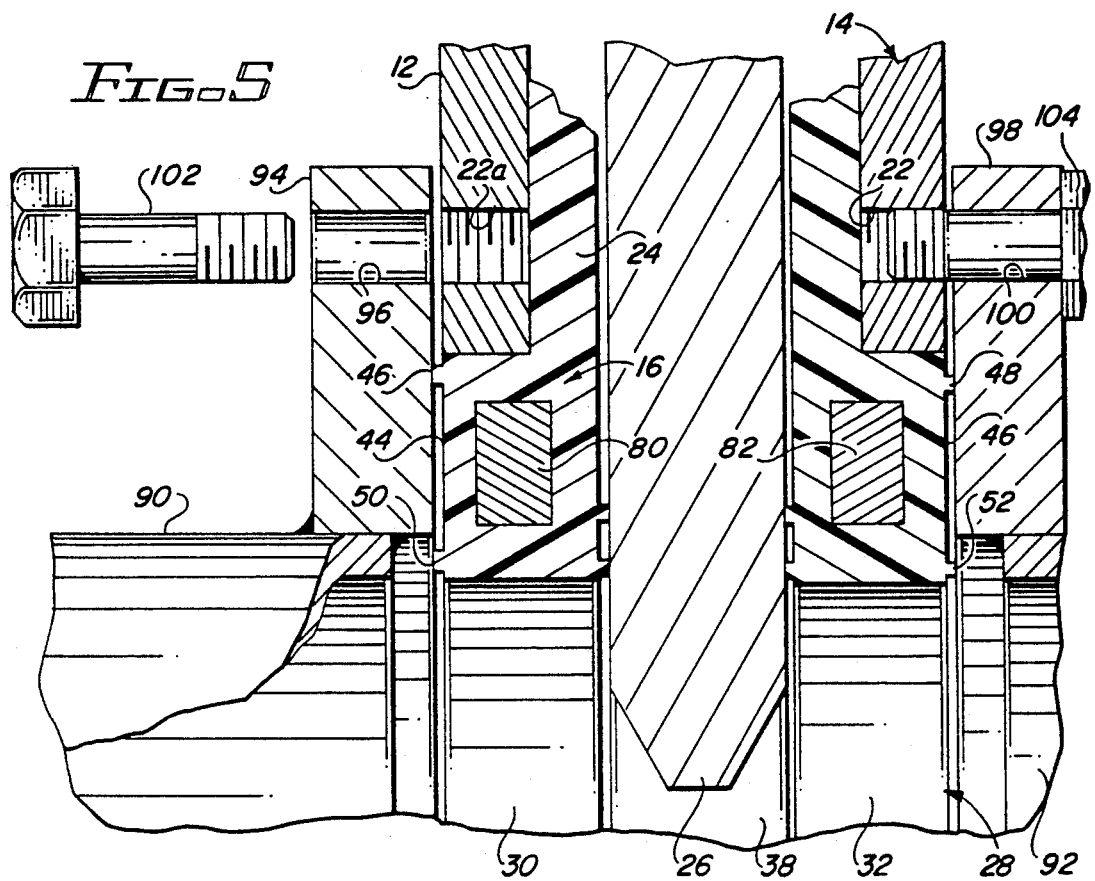
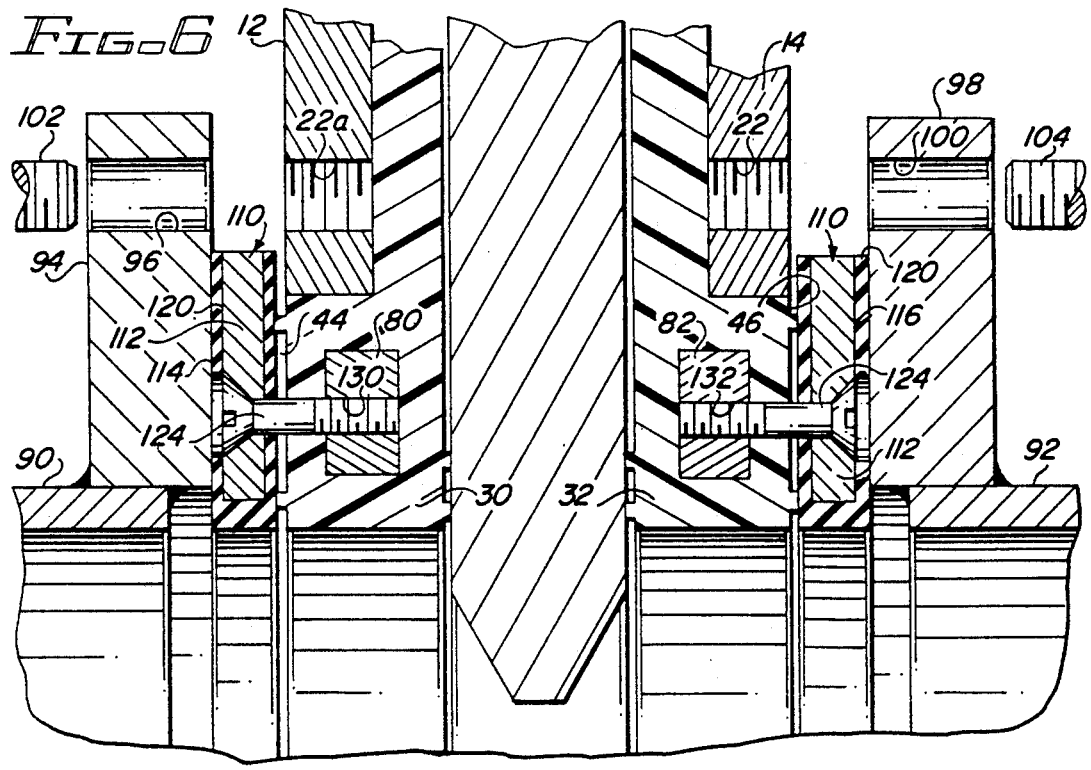

FLANGE SEAL

This is a continuation of application Ser. No. 07/851,467, filed on Mar. 13, 1992 now abandoned.

BACKGROUND OF THE INVENTION

1. Field of the Invention

The present invention relates to seals for gate valves and, more particularly, to seals for sealing the junction between opposed connected pipes and a gate valve.

2. Description of Related Art

Many years ago, predecessors in interest of the present assignee developed a chest and bore liner for use in gate valves having split metal, as described in further detail in U.S. Pat. Nos. 3,993,092, 4,051,863 and 4,112,969. A further configuration of a one piece liner for a gate valve and a gate seal usable therewith is described in U.S. Pat. No. 4,026,517. A yet further adaptation of such a one piece bore and chest liner is described in U.S. Pat. No. 4,951,919.

Recent experience with bore and chest liners of the type identified above suggests that a low rate leakage between the annular sealing face of the bore segment of the liner and the radial flange of a connected pipe may sometimes occur. Large sized split body gate valves on the order of 30 inches and having a bore and chest liner appear to be prone to such leakage. Under certain circumstances, similar low flow rate leakage may occur in smaller sized gate valves of this type. The split bodies of these gate valves are invariably of metal, and often of aluminum resulting in lighter weight. If the flow controlled by the gate valve is a flow of a fluid corrosive to aluminum, or other metal of which the gate valve may be made, corrosion of the gate valve body may result from the low flow rate leakage. Moreover, an attached radial flange and its connected pipe may become corroded.

The leakage may result in flow intermediate the chest of the gate valve and the chest segment of the lining. Should the leaking fluid be corrosive to the composition of the chest, pitting, flaking and corrosion will result. These discontinuities of the interior surface of the chest may begin to act in the manner of a wedge against the adjacent liner. Such wedging action will tend to impede sliding movement of the gate and/or increase the wear rate.

Analysis of the cause of the low rate leakage suggests that when the gate valve is in the open position with the gate raised, a minute collapse of the bore and chest liner in the vicinity of the lateral edges of the junction between the bore and the chest of the liner may be occurring. The lower edge of the gate is semicircular. At the interior lateral edges of the junction between the bore and the chest of the liner a void exists due to the raised position of the gate. Such void is believed to accommodate a slight collapse of the liner. The slight collapse of the liner at these two locations will reduce the pressure of the corresponding areas of the annular faces of the bore element of the bore and chest liner bearing against adjacent radial flange of each of the connecting pipes. With such reduction in pressure, the integrity of the seal may be compromised sufficiently to accommodate a low flow rate leakage. For other than large sized gate valves, the integrity of the seal between the annular faces of the bore and chest liner and the adjacent radial flanges of the connecting pipes appear to be unaffected.

SUMMARY OF THE INVENTION

Movement or flexing of the opposed bore elements of a bore and chest liner disposed within a split body gate valve are stabilized against movement and flexing through a ring embedded in each bore element. To further stabilize the bore elements, a circular flange seal is attached to the embedded ring disposed in each bore element and intermediate the annular face of each bore element and the respective radial flange of a connecting pipe. The flange seal may extend radially outwardly to be penetrably engaged by bolts securing the radial flange to the respective split body of the gate valve.

It is therefore a primary object of the present invention to enhance the seal between a gate valve and the radial flange of a connecting pipe.

Another object of the present invention is to enhance the seal between the opposed annular faces of a bore and chest liner disposed within a split body gate valve and the adjacent radial flanges of connecting pipes.

Yet another object of the present invention is to reduce the movement and flexing of the bore of a bore and chest liner disposed within a split body gate valve during retraction of the gate.

Still another object of the present invention is to provide a flange seal for enhancing the seal between a gate valve and the radial flange of a connecting pipe.

A further object of the present invention is to provide a flange seal secured to the bore element of a bore and chest liner disposed within a split body gate valve to form a seal between the gate valve and the radial flange of a connecting pipe.

A yet further object of the present invention is to provide a flange seal disposed between a gate valve and the radial flange of a connecting pipe.

A still further object of the present invention is to provide a method for reducing the movement and flexing of a bore and chest liner disposed within a split body gate valve before, during and after movement of the associated gate.

These and other objects of the present invention will become apparent to those skilled in the art as the description therein proceeds.

BRIEF DESCRIPTION OF THE DRAWINGS

The present invention will be described with greater specificity and clarity with reference to the following drawings, in which:

FIG. 1 illustrates a partial side view of a split body gate valve having a bore and chest liner disposed therein;

FIG. 2 is a partial cross-sectional view of a gate valve of the type illustrated in FIG. 1;

FIG. 3 is an elevational view of a flange seal locatable intermediate an element bore of a bore and chest liner and the radial flange of a pipe connected to a gate valve body;

FIG. 4 is a cross-sectional view taken along lines 4—4, as shown in FIG. 3;

FIG. 5 is a partial cross-sectional view illustrating attachment of the radial flanges of opposed connecting pipes with the gate valve assembly illustrated in FIG. 2;

FIG. 6 is a partial cross-sectional view illustrating disposition of a flange seal of the type illustrated in FIGS. 3 and 4 intermediate the gate valve body illustrated in FIG. 2 and the radial flanges of opposed connecting pipes;

DESCRIPTION OF THE PREFERRED EMBODIMENT

Figure 7:
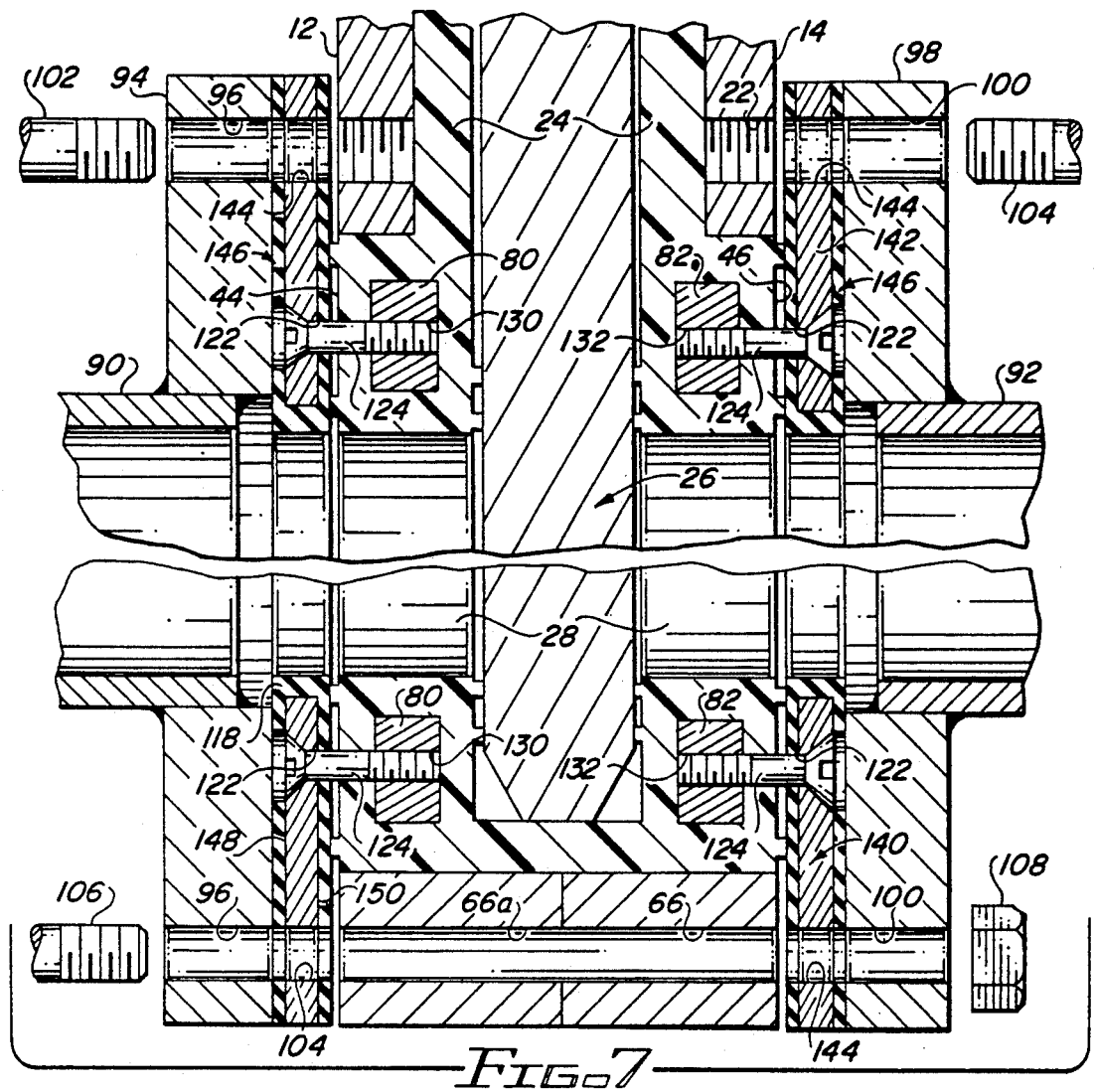
FIG. 7 illustrates a variant flange seal disposed intermediate opposed sides of a gate valve of the type shown in FIG. 2 and the radial flanges of opposed connecting pipes.

Referring jointly to FIGS. 1 and 2, there is shown a gate valve 10, which gate valve, without stabilizing rings 80 and 82, is illustrated and described in the above referenced United States Patents, which illustrations and descriptions are incorporated herein by reference. The gate valve includes a split body formed by a pair of essentially mirror image body halves 12,14. A bore and chest liner 16 is disposed within commensurately sized cavities 20,22 formed within body halves 12,14, respectively. A chest segment 24 of the bore and chest liner sealingly accommodates translation of gate 26 therein. A bore segment 28 includes annular bore elements 30,32 disposed within bores 34,36 of body halves 12,14, respectively. A groove 38, extending downwardly from opposed sides of gate cavity 40 in chest segment 24 receives and sealingly engages lower edge 42 of gate 26. Bore segment 28 includes annular faces 44,46 for sealing engagement with the radial flange of a pipe connected to the respective annular face. To increase the effectiveness of the seal, one or more rings 48,50 may be formed in each annular face. It is to be understood that various sealing mechanisms, such as ridges, and the like, may be formed within chest segment 24 to effect a seal between the chest segment and gate 26 to prevent flow of material intermediate the gate and the chest segment.

A plurality of bores, such as bores 60,62,64, may be formed adjacent the perimeter of body halves 12 and 14 to secure the body halves to one another and to retain the bore and chest liner therewithin. A plurality of further bores, such as bores 66,68, and 70 may be disposed about the bore of gate valve 10 to receive through bolts for securing the radial flanges of opposed connecting pipes. Bores, such as bore 72 may be threaded to receive bolts interconnecting the radial flange of a connected pipe since the bore and chest liner as well as the gate preclude the use of bolts at this location which extend through the gate valve.

Referring jointly to FIGS. 2 and 5, there is shown a steel ring 80 formed within and encased by annular bore element 30 of bore segment 28 of the bore and chest liner. A similar ring 82 is embedded within annular bore element 32 of bore segment 28. These rings are preferably essentially encased within the respective annular bore elements. Accordingly, the existing seal related elements associated with bore segment 28 remain unaffected by the embedded rings. However, during retraction of gate 26, a partial retraction being illustrated in FIGS. 1 and 2, the lower lateral portions of gate cavity 40 within chest segment 24 is open and not filled by a part of the gate. This unfilled part of gate cavity 40 will permit a slight collapse of the unsupported opposed sides of the chest liner. Such partial and minute collapse may have a detrimental effect upon the sealing capability of the portions of annular faces 44,46 positionally corresponding with any slightly collapsed part of the chest liner. Such reduced sealing capability, under high pressure, may result in a low flow rate leakage of fluid intermediate an annular face and the corresponding radial flange of a connected pipe. By incorporating rings 80,82 movement or flexing of annular bore elements 30,32 is severely restrained. Such restraint is particularly important when the gate is in its retracted position for reasons discussed above.

Referring to FIG. 5, the attachment of connecting pipes 90,92 is shown in further detail. Pipe 90 includes a radial flange 94 having a bore 96 for receiving a bolt 102. The bolt threadedly engages bore 22a in body half 12. Upon tightening of this bolt, along with the remaining bolts associated with the flange and corresponding bores in body half 12, flange 92 is drawn against annular face 44 of bore element 30. It will engage sealing rings 48,50 disposed therein to effect a seal. Because of the stabilizing influence exerted by ring 80 disposed within bore element 30, movement and flexing of the bore element adjacent flange 94 is restrained. Pipe 92 includes a similar radial flange 98 having a bore 100 for receiving a bolt 104 to be threadedly engaged with threaded bore 22 in body half 14. Upon tightening of this bolt, along with the further bolts penetrably engaging flange 98, the flange is drawn against annular face 46 to form a seal therebetween, which seal is augmented by sealing rings 48,50. Ring 82, embedded within bore element 32, restrains movement or flexing of the bore element and commensurate displacement of annular face 46. Accordingly, the seal between the annular face and annular flange 98 is enhanced irrespective of the translated position of gate 26.

For medium and large sized gate valves stabilization of bore elements 30,32 in addition to that provided by rings 80,82 may be required. Referring jointly to FIGS. 3, 4 and 6, a flange seal 110 for use intermediate an annular face of bore and chest liner 16 and a radial flange of a connected pipe will be described. The flange seal includes a washer like ring 112 formed of relatively robust material capable of withstanding significant compressive forces without deformation. Sidewalls 114,116 may be lined with material unaffected by and impervious to the fluid to be conveyed through the gate valve. Preferably, the material adjacent the radial flange of the connected pipe is compressible to a degree to assist in providing an effective sealing function. Typical materials may be rubber or urethane. Experiments indicate that rings 48,50 of the annular face (44,46) provide a better seal if compressed against a hard rigid surface than against a compressible surface. Where the ring may be of material corrosively affected by the fluid conveyed, inner surface 118 may also be lined. Typically, the lining 120, as depicted in FIG. 4, may be U-shaped in cross-section to line the three surfaces of the ring likely to come in contact with the fluid conveyed. Ring 112 includes a counter sunk bore 122 for receiving a counter sunk bolt 124. Necessarily, liner 120 would include an aperture 126 in alignment with bore 122 to accommodate the head of the bolt. As depicted in FIG. 3, flange seal 110 includes a plurality of bores 122.

As illustrated in part in FIG. 6, each of rings 80,82 disposed in their respective bore elements, 30,32 include a plurality of threaded cavities 130,132, respectively. The number of these threaded cavities along with their respective spacing, are commensurate with the number and spacing of bores 122 in flange seal 110. Thereby, bolts 124 are used to secure a flange seal 110 to each of rings 80,82. By appropriate tightening of bolts 124, the flange seals will be brought to bear tightly against respective annular surfaces 44,46 of bore elements 30,32, respectively. Because of the forces drawing each ring 112 toward the respective one of rings 80,82 in bore elements 30,32, movement or flexing of the bore elements, irrespective of cause, will be essentially precluded. The resulting immobility of bore elements 30,32, in combination with the pressure of annular surfaces 44,46 (and rings 48,50) bearing against the respective one of flange seals 110, no leakage therebetween will occur irrespective of the translatory position of the gate valve. Thus, the connected pipes, their radial flanges and the exterior of the gate valve will not become corroded by leaking fluid. Furthermore, no leaking fluid will exist to seep intermediate the gate valve body and the bore and chest liner.

The resulting effectiveness of the seal has been of particular significance in large sized gate valves on the order of 30 inches or more. However, even for gate valves on the order of 18 to 30 inches, improvements have been noted. Such improvements are of significant import to longevity of the gate valve at remote locations and at locations where material corrosive to the gate valve body are transported therethrough.

The attachment of radial flange 94 of a connected pipe 90 to body half 12 is equivalent to that described with respect to FIG. 5. However, since flange seal 110 is radially within the perimeter of bore 96, a space exists between bore 96 and threaded cavity 22a. Nevertheless, upon tightening of bolt 102 penetrably engaging bore 96 and threaded cavity 22a, radial flange 94 is brought into sealing engagement with liner 122 adjacent surface 114 of ring 112. Similarly, bolt 104 penetrably engaging bore 100 and threadedly engaging threaded cavity 22, draws radial flange 98 of pipe 92 adjacent liner 120 lining surface 116 of ring 112 to effect a seal therebetween. Because of the robustness of flange seals 110 and rings 80,82, essentially all movement and flexing of bore elements 32 is eliminated and the seal between radial flanges 94,98 and body halves 12,14 of gate valve 10 is maintained inviolate.

Figure 8:
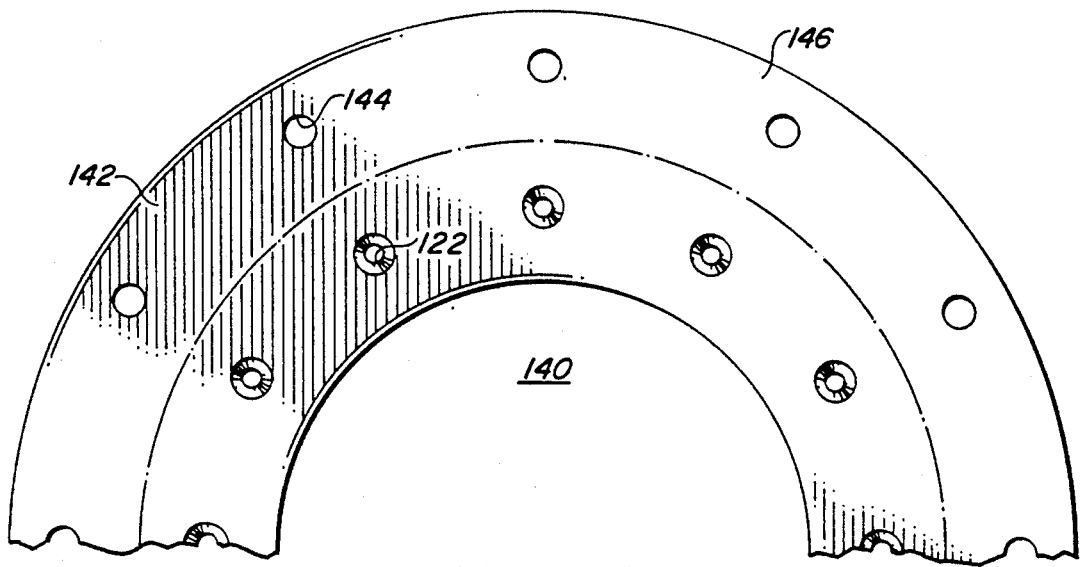
FIG. 8 is a partial elevational view of the flange seal illustrated in FIG. 7.

Under certain circumstances, is may be preferable to avoid the gap provided by flange seal 110, as illustrated in FIG. 6. A variant flange seal 140 for this purpose is illustrated in FIGS. 7 and 8. This flange seal is duplicative of flange seal 110 described above except that it includes a radial dimension sufficient to penetrably receive the bolts extending through the radial flanges of the pipes connected to opposed sides of gate valve 10. For simplicity and cohesiveness of description, elements illustrated in FIGS. 7 and 8 common with earlier described elements will be identified with corresponding reference numerals. Ring 142 includes bores 122, as described above. In addition, it includes a plurality of further bores 144 positionally commensurate with bores 66, 68, 70 and threaded bores 22. Liner 146 is equivalent to liner 120 shown in FIG. 4 and it is extended across opposed radial surfaces 148,150 of each flange seal 140. The liner also extends across inner annular surface 118, as described above. Flange seal 140 is secured adjacent annular face 44 by a plurality of counter sunk bolts 124 penetrably engaging counter sunk aperture 122 in ring 142 and threadedly engaging threaded bore 130 in ring 80. This attachment provides, as discussed above, a relatively rigid immobile and non flexing seal against flange seal 140. Similarly, a flange seal 140 is brought into sealing engagement with annular face 46 by counter sunk bolts 124 penetrating counter sunk aperture 122 in ring 142 and threadedly engaging threaded cavity 132 in ring 82. Upon such attachment of opposed flange seals 140, apertures 144 will be in alignment with threaded cavities 22(22a) and each of smooth surface bores 66, 68 and 70 disposed in each of body halves 12,14.

For illustrative purposes, alignment of bores 144 is shown in FIG. 7 with respect to threaded cavities 22,22a and smooth surfaced bores 66 and 66a disposed in body halves 12 and 14, respectively. Radial flange 94, extending from the end of pipe 90 includes bores 96 axially aligned with threaded cavity 22a and each of the smooth surfaced bores disposed in body half 12, of which bore 66a is shown. Similarly, radial flange 98 of pipe 92 includes a plurality of bores 100 in axial alignment with one of threaded cavity 22 and smooth surfaced bore 66, 68 and 70, of which bore 66 is shown in FIG. 7. Gate valve 10 is secured to the radial flanges of the connecting pipes by penetrably engaging the bores in the respective flanges axially aligned with threaded cavities 22 and 22a with bolts 104,102, respectively. Additional nut and bolt means 106,108 are penetrably inserted through the remaining bores (such as 66, 66a, 68 and 70 illustrated) to secure the radial flanges with the gate valve. Upon such engagement of the radial flanges, the respective bolts (102,104,106) will also penetrably engage the corresponding one of bores 144 and radial flanges 140. It may be pointed out that, for illustrative purposes, gate 26 is shown in the fully extended position in FIG. 7 whereby flow intermediate pipes 90 and 92 is precluded.

As discussed above with respect to flange seal 110, flange seals 140 not only provide sealing engagement with the bore elements (30,32) of bore segment 28 of bore and chest liner 16 but also provide additional rigidity to the bore segment to prevent any collapse of the liner upon retraction of the gate. Thereby, the low rate leakage sometimes experienced with large sized gate valves not having flange seals (110 or 140) will be eliminated.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. In a gate valve having a bore section and a chest section including a one piece bore and chest liner having a bore segment disposed in the bore section of the gate valve and a chest segment disposed in the chest section of the gate valve and a gate translatable within the one piece bore and chest liner to open and close the gate valve as a function of the position of the gate relative to the one piece bore and chest liner, which bore segment includes a slot for accommodating translation of the gate to and from the bore segment from and to the chest segment, respectively, a groove disposed in the bore section for receiving the lower edge and lower sides of the gate in sealed engagement upon translation of the gate to the bore segment, and a pair of opposed annular surfaces, the improvement comprising in combination:

a) a first stabilizing ring of rigid material captured within and encapsulated by the bore segment of the one piece bore and chest liner and disposed on one side of the groove and the slot in the bore segment of the one piece bore and chest liner for minimizing flexing of the one side of the bore segment of the one piece bore and chest liner during translation of the gate;

b) a second stabilizing ring of rigid material captured within and encapsulated by the bore segment of the one piece bore and chest liner and disposed on the other side of the groove and the slot in the bore segment of the one piece bore and chest liner for minimizing flexing of the other side of the bore segment of the one piece bore and chest liner during translation of the gate;

c) a first flange seal for detachable attachment to one of the annular surfaces;

d) a second flange seal detachable attachment to the other of the annular surfaces;

e) first detachable attachment for detachably attaching said first flange seal to said first stabilizing ring to locate said first flange seal adjacent the one annular surface; and f) second detachable attachment for detachably attaching said second flange seal to said second stabilizing ring to locate said second flange seal adjacent the other annular surface.

2. The improvement as set forth in claim 1 wherein each of said first and second stabilizing rings is of steel.

3. The improvement as set forth in claim 1 wherein each of said first and second stabilizing rings has a radial dimension and an axial dimension and wherein the radial dimension is greater than the axial dimension.

4. The improvement as set forth in claim 1 wherein each of said first and second detachable attachments comprises a threaded bolt and a threaded bore disposed in the respective one of said first and second stabilizing rings for receiving one of said threaded bolts.

5. Apparatus for stabilizing a one piece bore and chest liner disposed within the bore section and chest section of a gate valve for guiding translation of a gate of the gate valve and for engaging radial flanges of opposed pies attachable to the gate valve, which one piece bore and chest liner includes: i) a chest segment disposed in the chest section of the gate valve for translatably supporting the gate, ii) a bore segment disposed in the bore section of the gate valve, iii) a groove disposed in the bore segment for receiving and sealingly engaging the side and lower edges of the gate, and iv) a pair of opposed annular surfaces disposed on the bore segment, said apparatus comprising in combination:

a) a first stabilizing ring disposed in and encapsulated by the bore segment of the one piece bore and chest liner on one side of the groove;

b) a second stabilizing ring disposed in and encapsulated by the bore segment of the one piece bore and chest liner on the other side of the groove;

c) a first flange seal disposed adjacent one of the annular surfaces for sealing engagement with the radial flange of one of the pipes;

d) a second flange seal disposed adjacent the other of the annular surfaces for sealing engagement with the radial flange of the other of the pipes;

e) a first attachment for detachably attaching said first flange seal to said first stabilizing ring; and f) a second attachment for detachably attaching said second flange seal to said second stabilizing ring.

6. The apparatus as set forth in claim 5 wherein each of said first and second flange seals includes an annular member and compressible material disposed on opposed sides of each of said annular members for compressive engagement by the respective annular surface and radial flange.

7. The apparatus as set forth in claim 5 wherein each of said first and second attachments comprises a plurality of bolts, and threaded bores disposed in the respective one of said first and second stabilizing rings for threadedly receiving respective ones of said plurality of bolts.

8. Apparatus for improving the sealing function of a bore segment disposed within the bore section of a gate valve, which bore segment includes first and second annular surfaces disposed on opposed sides of the bore segment, said apparatus comprising in combination:

a) a first stabilizing ring disposed in one part of the bore segment;

b) a second stabilizing ring disposed in another part of the bore segment;

c) a first annular flange separate of and distinct from the bore segment and locatable adjacent one of the first and second annular surfaces;

d) a first interconnection for interconnecting said first annular flange with said first stabilizing ring;

e) a second annular flange separate of and distinct from the bore segment and locatable adjacent the other of the first and second annular surfaces; and f) a second interconnection for interconnecting said second annular flange with said second stabilizing ring.

9. Apparatus for improving the sealing function of a bore segment disposed within the bore section of a gate valve, which bore segment includes first and second annular surface disposed on opposed sides of the bore segment, said apparatus comprising in combination:

a) a first stabilizing ring disposed in one part of the bore segment;

b) a second stabilizing ring disposed in another part of the bore segment;

c) a first annular flange locatable adjacent one of the first and second annular surfaces;

d) a first plurality of bolts for interconnecting said first annular flange with said first stabilizing ring;

e) a second annular flange locatable adjacent the other of the first and second annular surfaces; and f) a second plurality of bolts for interconnecting said second annular flange with said second stabilizing ring.

10. The apparatus as set forth in claim 9 wherein each of said first and second stabilizing rings comprise metallic rings.

11. The apparatus as set forth in claim 9 wherein each of said first and second annular flanges include compressible material disposed on opposed sides.

12. The apparatus as set forth in claim 9 wherein each of said first and second stabilizing rings include threaded means for threadedly receiving respective ones of said plurality of bolts.

13. The apparatus as set forth in claim 12 wherein each of said first and second flanges include apertures for penetrably receiving respective ones of said plurality of bolts.

14. The apparatus as set forth in claim 9 wherein the bore segment includes a slot and a groove for receiving a gate of the gate valve and wherein said first and second stabilizing rings are disposed in the bore segment on opposed sides of the slot and the groove.

* * * * *